Figure 7:
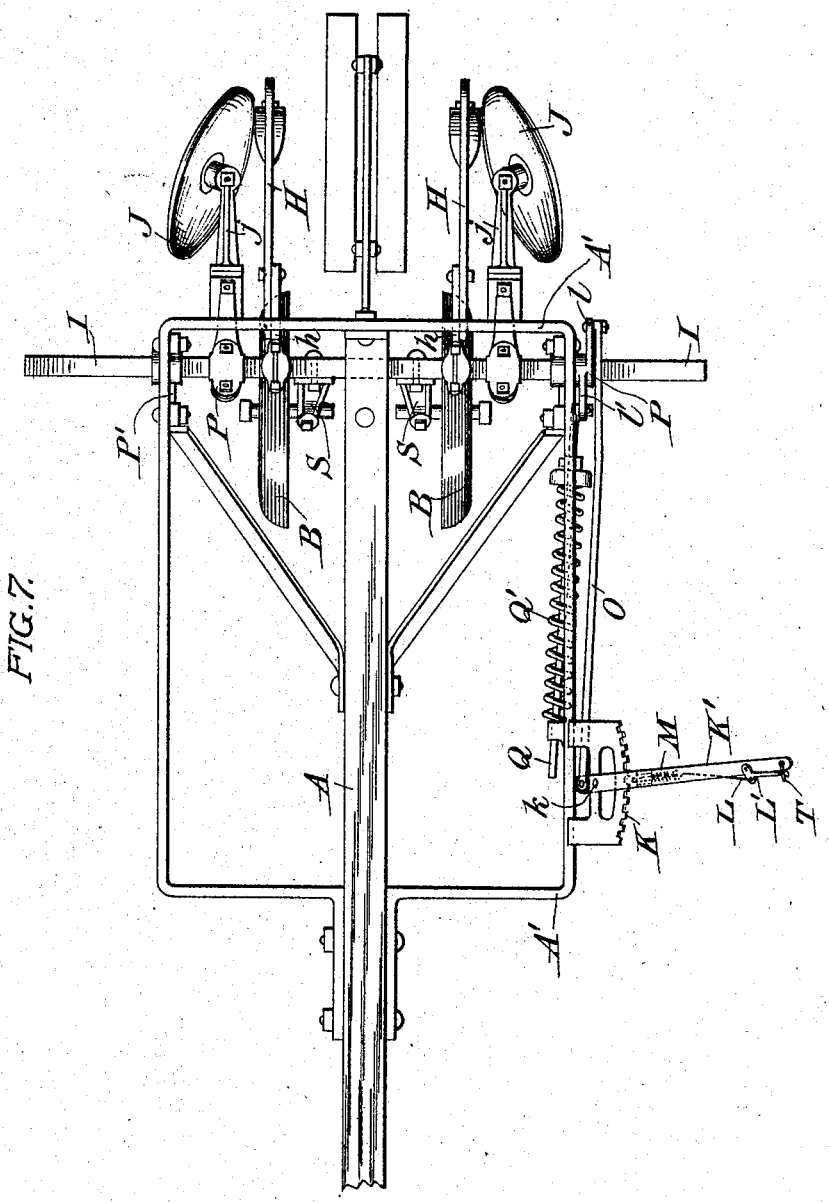

No. 806,100. PATENTED DEC. 5, 1905.
C. J. BORDEN.
CULTIVATOR.
APPLICATION FILED JAN. 13, 1905.
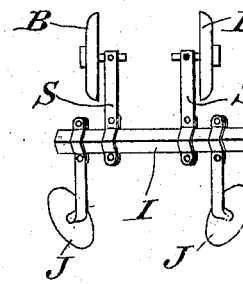
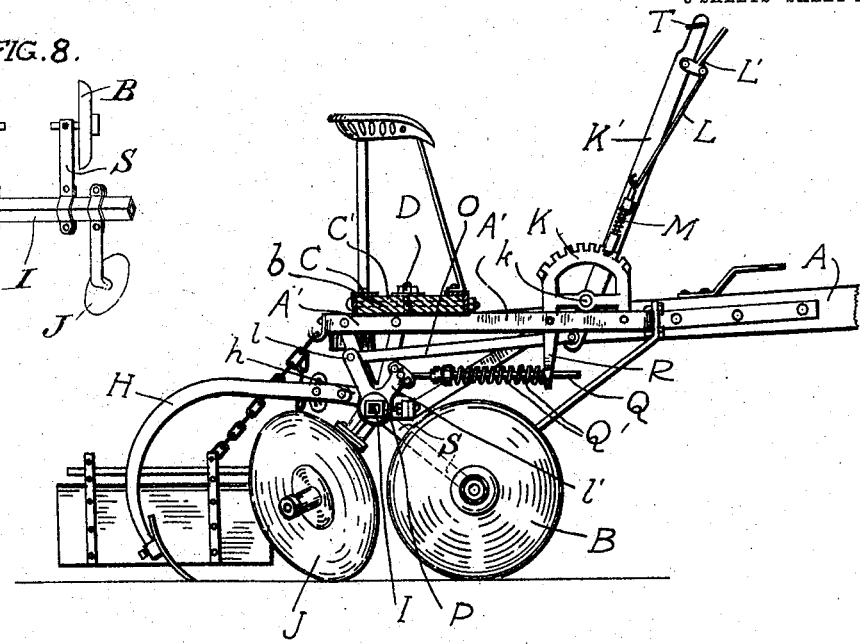
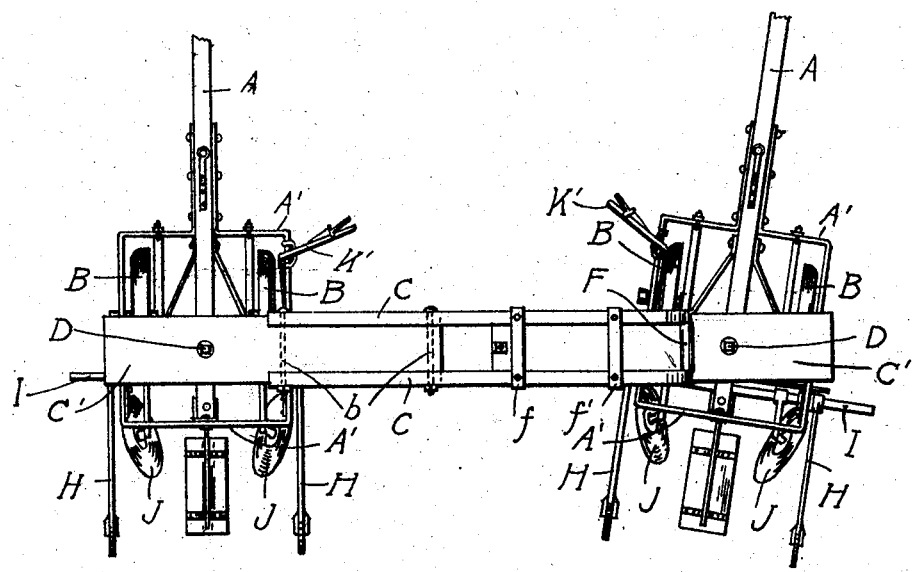
WITNESSES:
William Gordon
INVENTOR.
Charles J. Borden
BY Eugene Ayres
ATTORNEY.

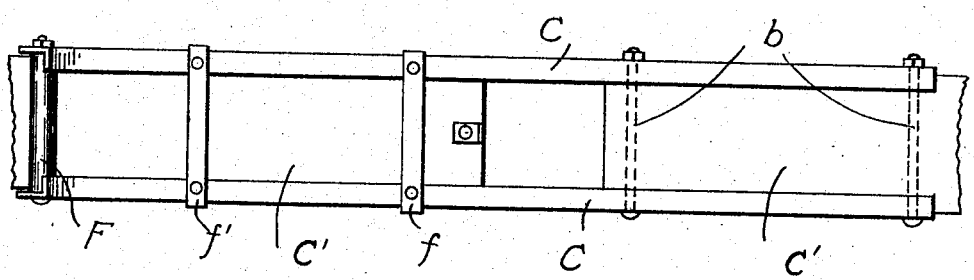
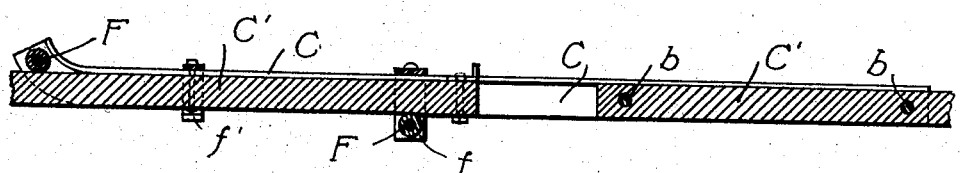
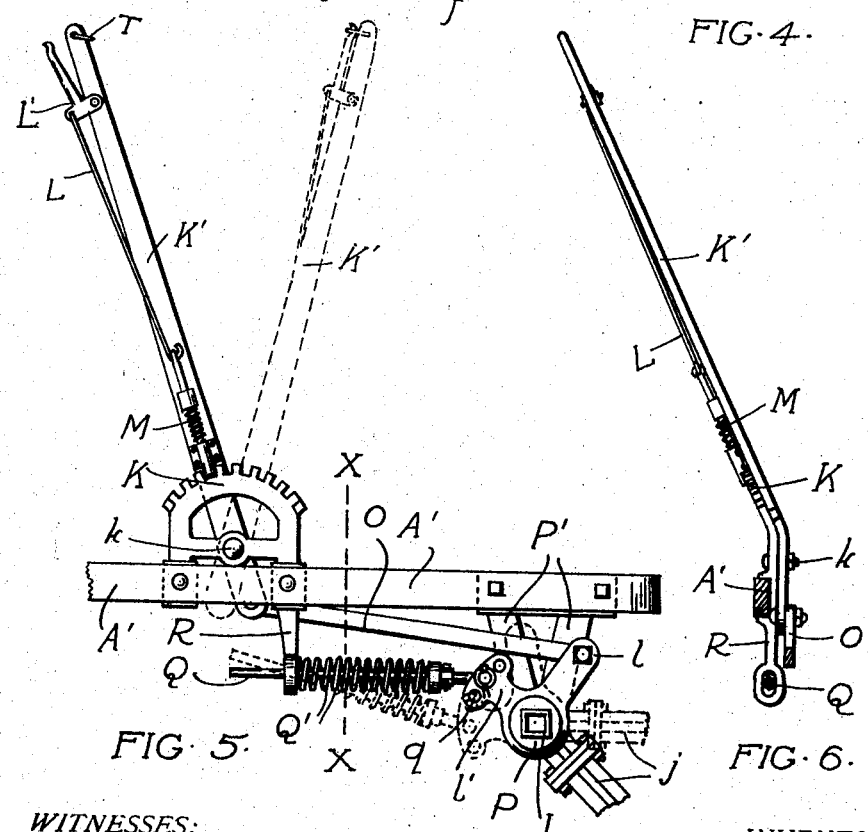

No. 806,100. PATENTED DEC. 5, 1905.
C. J. BORDEN.
CULTIVATOR.
APPLICATION FILED JAN. 13, 1905.

3 SHEETS—SHEET 3.

Witnesses:
Loto Vigue
John H. Wilson

Inventor:
Charles J. Borden
By Eugene Ayres,
Attorney

UNITED STATES PATENT OFFICE.

CHARLES J. BORDEN, OF ST. JOSEPH, MISSOURI.

CULTIVATOR.

No. 806,100.　　　　Specification of Letters Patent.　　　　Patented Dec. 5, 1905.

Application filed January 13, 1905. Serial No. 240,893.

*To all whom it may concern:*

Be it known that I, CHARLES J. BORDEN, a citizen of the United States, residing at St. Joseph, in the county of Buchanan and State of Missouri, have invented certain new and useful Improvements in Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is to provide a lister corn-cultivator in which the seat-board automatically adjusts itself between the frames to the different widths of rows while the machine is in operation and in which the mechanism may also automatically throw the disks out of the ground as the cultivator passes across broken ground or ditches.

I accomplish my object by the mechanism illustrated in the accompanying drawings, in which—

Figure 1 is a side elevation of a cultivator, showing the seat-board and an arm that automatically throws the disk out of the ground when an extraordinary pressure is brought on the disk or gang and also showing the lever and connections by which the disk may be returned into the ground. Fig. 2 is a top view of a two-row cultivator, the seat only omitted. Fig. 3 is a top view of a seat-board, showing its two parts separated and the angle-irons in which the board travels. Fig. 4 is a longitudinal section view of said seat-board, the two parts separated, and of one of the angle-irons and its rollers and supports. Fig. 5 is a side elevation showing the lever for throwing the disk in the ground and the spring-and-arm connection for automatically throwing the disk out of the ground when there is a heavy pressure on the gang. Fig. 6 is a rear view of the same on line *x x* of Fig. 5. Fig. 7 is a top plan view with the divided seat-board removed, and Fig. 8 is a detail of a square bar and the connections of the cultivator wheels and disks therewith.

Similar letters of reference in my specification indicate corresponding parts throughout the several views.

In the drawings, A A represent the tongues of the cultivator; A' A', the parts of the frame; B B, wheels attached to the machine by any ordinary arms and braces; C C, the angle-irons within which the two parts of a seat-board C' travel as the disk-frames follow the different widths of rows.

D D are pins inserted through the seat-board and tongues, which serve as pivots upon which the frames turn and by which the seat-board is permanently attached to said frames.

F F are rollers on which the seat-board travels back and forth between the frames. The angle-irons at one end are upturned, as shown in Fig. 4, to receive one of said rollers on the top of the seat-board. The roller beneath the board is supported by a bracket *f*, that projects below the angle-iron to receive the roller. This bracket at the same time serves to hold the angle-irons in position.

*f'* is a bracket to assist in supporting the angle-irons and which projects down underneath to prevent the angle-irons being lifted off the seat-board.

*b b* are bolts for holding the angle-irons rigid to one part of the seat-board.

A shovel-gang H is attached to arm *h*, which is rigidly connected with a square bar I. Disk J is also provided with an arm *j*, connected with said square bar I.

K is a ratchet rigidly attached to the frame. K' is a lever; L, a rod connected at its upper end with said lever by means of a hand-hold-lever L' and at its lower hooked end with a plunger M, which is adapted to engage in the cogs of said ratchet. Lever K' is pivoted to said ratchet by a bolt *k*. A strap O is pivoted at its front end to the lower end of lever K', while its rear end is pivoted to an arm *l* of a casting P, which is secured to and operates on said square bar I.

P P are rigid castings each with a square hole fitted on bar I and a round extended end passing through round holes in the lower ends of arms P' P', thereby making a journal. Said arms P' P' support the frame, the arms extending down to bar I.

Each wheel B, with hub in the center, has a round-headed axle passing through its hub to the inside.

Arms S S are securely fastened to bar I between castings P P.

A rod Q, carrying spiral spring Q', is pivotally connected with an adjustment-arm *l'*, integral with the casting P, provided with perforations *q q*, and extending forward of said casting, the opposite end of said rod Q and its spring being carried by an arm R, extending below the frame in front.

A loop T, attached to the top of lever K', is adapted to be thrown over handhold-lever L' for the purpose of raising plunger M clear of the ratchet, allowing the lever to work backward and forward on the ratchet, thereby whenever extraordinary pressure is on a gang or disk compressing this spring throwing arm l' down, allowing the gang and disks to rise out of the ground.

It will be readily seen that when lever K' and handhold-lever L' are in the position shown in Fig. 5 the disk will be held in the ground by the mechanism having connection with said lever K' and that when said lever is reversed to the position shown in said figure by dotted lines, the connecting mechanism being also thrown into the position shown by dotted lines, the disk will be thrown out of the ground.

While I preferably use rollers for the easy adjustment of the seat-board, these rollers might be dispensed with and the seat-board allowed to adjust itself on irons.

What I claim as new, and desire to secure by Letters Patent, is—

1. In a lister-cultivator the combination with the frames, the tongues and the disks, of a seat-board of two parts each pivotally attached to the top of a tongue, the angle-irons to carry and guide said seat-board, the lower roller and its bracket, the upturned ends of the angle-irons and the upper roller therein, the lever and loop and its handhold-lever and the ratchet, the supports on the frames, bars journaled in the supports, castings on the bars, an arm on one of said castings and the strap forming pivotal connection between said arm and the lever, the casting-arm provided with adjustment-perforations, the rod and spiral spring thereon bearing at one end against said adjustment-arm and at the other end against a support extending below the frame, said mechanism allowing the disk and gang to relieve themselves when extraordinary pressure is brought to bear upon them by uneven ground or obstructions, substantially as shown and set forth.

2. In a two-row lister-cultivator the combination with the cultivator frames and tongues, of a seat-board in two parts each part pivotally attached near its outer end across the top of a tongue of the cultivator, the angle-irons in which the two sections of said board travel back and forth as the cultivator travels in rows varying in width from each other, the upturned ends of the angle-irons and the roller supported thereby above the seat-board, a bracket turned down below the angle-iron and the roller supported thereby under said seat-board, said rollers assisting the board in easy adjustment to the varying widths between the rows, substantially as shown and described.

3. In a lister-cultivator the combination with the frame, tongue, wheels and disks of a ratchet and lever, a handhold-lever and a loop and a plunger, supported on said frame, a casting adapted to support the frame, a square bar journaled into the lower part of said casting, a casting-arm rigidly attached to and adapted to operate said journaled bar, a strap pivotally connected at one end with said arm and at the other end with the fulcrum end of said lever, an arm provided with perforations to allow for adjustment, an arm extending vertically below the frame, a rod one end of which is carried by said arm the other end having connection with the perforations in said adjustment-arm, a spiral spring carried on said rod, the arms attached to the disks and having rigid connection with said journaled bar so that when said ratchet and spiral spring operate on the casting the arms will press the disks into or withdraw them out of the ground, substantially as set forth and shown.

4. In a lister-cultivator the combination with cultivator-frames provided with cultivating devices, of cultivator tongues and disks, a divided seat-board pivotally carried on and permanently fastened to the tops of said tongues at corresponding opposite points, angle-irons carried by the sections of said seat-boards and by which said sections are guided automatically end to end, in and out, as the disks and frames follow rows separated by varying widths, and the rollers above and beneath which the sections travel, substantially as shown and described.

5. In a two-row cultivator the combination with the frames, wheels, guiding-irons and tongues, of a divided seat-board each part pivotally attached on the top of a tongue the inner ends of said divided seat-board adapted to be in proximity with each other when the frames are at a minimum distance apart and to be drawn away from each other as the frames pass to a maximum distance apart, substantially as shown and set forth.

6. In a cultivator the combination with the cultivator frames, tongues and disks, of a seat-board consisting of two sections carried pivotally on and permanently attached to said tongues at corresponding opposite points, and angle-irons carried by said seat-board sections and forming guides for them as the disks and frames follow rows of varying widths, substantially as set forth and shown.

In testimony whereof I affix my signature in presence of two witnesses.

CHARLES J. BORDEN.

Witnesses:
I. K. ENRIGHT,
H. B. LYSAGHT.